United States Patent [19]

Kikuzawa et al.

[11] Patent Number: 4,568,582

[45] Date of Patent: Feb. 4, 1986

[54] INTERNALLY THREADED FIBER-REINFORCED PLASTIC MEMBER AND A METHOD OF PRODUCING THE SAME

[75] Inventors: Kenji Kikuzawa; Yukio Ōtaki, both of Moriyama, Japan

[73] Assignee: Asahi Kasei Kogyo Kabushiki Kaisha, Osaka, Japan

[21] Appl. No.: 584,404

[22] Filed: Feb. 28, 1984

[30] Foreign Application Priority Data

Feb. 28, 1983 [JP] Japan .................................. 58-30876
Jul. 1, 1983 [JP] Japan ................................ 58-119870

[51] Int. Cl.$^4$ ............................................ B65D 23/00
[52] U.S. Cl. ..................................................... 428/35
[58] Field of Search .......................................... 428/36

[56] References Cited

U.S. PATENT DOCUMENTS 2,843,153 7/1958 Young .
3,128,322 4/1964 Young .
3,495,494 2/1970 Scott .
3,713,932 1/1973 Butzow et al. .
4,167,429 9/1979 Ackley .
4,211,818 7/1980 Ackley .
4,220,496 9/1980 Carley et al. .
4,220,497 9/1980 Carley .

FOREIGN PATENT DOCUMENTS 54-30422 10/1979 Japan .
54-35232 11/1979 Japan .

Primary Examiner—Joseph L. Schofer
Assistant Examiner—N. Sarafim
Attorney, Agent, or Firm—Birch, Stewart, Kolasch & Birch

[57] ABSTRACT

An internally threaded fiber-reinforced plastic member comprising a hollow body which has a body portion and a central bore, in which at least one crossing pair of unified groups of resin-impregnated strands are arranged substantially in perpendicular relation to the axis of the member, has been found to be extremely excellent in mechanical strength. Such an internally threaded member can be produced with high productivity and at low cost, utilizing filament winding technique, although the production method is not limited thereto.

6 Claims, 9 Drawing Figures

INTERNALLY THREADED FIBER-REINFORCED PLASTIC MEMBER AND A METHOD OF PRODUCING THE SAME

BACKGROUND OF THE INVENTION

This invention relates to an internally threaded fiber-reinforced plastic member and a method of producing the same. More particularly, the present invention is concerned with an internally threaded fiber-reinforced plastic member comprising a hollow body and an integrally formed thread on the inner surface of the bore, and having a unique interior structure in which at least one crossing pair of unified resin-impregnated strand groups is arranged substantially in perpendicular relation to the axis of the member, and also is concerned with a method of producing the same.

Metals or metal alloys such as iron and stainless steel are widely employed as a material for forming threaded members such as bolts and nuts. Metal bolts and nuts are employed as a fastening means in a wide variety of applications including manufacture of playthings and building of large-scale industrial or commercial constructions. However, the use of metal bolts and nuts inevitably encounters serious problems. One of such problems is corrosion. At present, metal bolts and nuts are still often used in corrosive environments. The use of metal bolts and nuts in chemical plants, water or sewage treating plants and the like often leads to fatal dangers. Further, it is noted that metal bolts and nuts are unsuitable for use in marine constructions such as a boat, and artificial reef construction, and the like, since they are caused to incessantly come in contact with the sea water, leading to destruction of the constructions. Another important problem resides in electrical and thermal conductivity of the metal bolts and nuts. There are a number of applications where bolts and nuts are required not to be thermally and electrically conductive. Representative examples of such applications are manufacture of heavy electrical devices or equipments, and construction of electrically-powered transportation devices such as cars for an electrically-powered train, streetcar, etc. For such applications, metal bolts and nuts must be coated with an insulating material. However, the currently employed insulated metal bolts and nuts are still unsatisfactory in various points.

With respect to corrosion resistant metals which can be used as a material for bolts and nuts, it is well known that titanium is a metal which is comparatively resistant to corrosion. Further, due to its small specific gravity, titanium is considered to be useful for forming bolts and nuts. However, titanium is not only expensive but also poor in processability. For this reason, the use of titanium-made bolts and nuts are restricted to special fields, for example, aero-space industry. With respect to electrically non-conductive bolts and nuts, there have recently been proposed bolts and nuts made of ceramics due to the rapid progress of ceramics industry. However, satisfactory ceramic-made bolts and nuts have not yet been developed.

In order to cope with the problem of corrosion, bolts and nuts made of a synthetic resin have been proposed. Such resin-made bolts and nuts, however, are very poor in mechanical strength as compared with those made of a metal, and, hence, cannot be an effective substitute for metal bolts and nuts in the application field where a high mechanical strength is required. Therefore, the application of the resin-made bolts and nuts is restricted to a field where the corrosion resistance is strongly required but the mechanical strength is not a matter of importance.

In the field of manufacture of heavy electrical devices or equipments, as a nut which is required to have excellent mechanical strength and insulating properties, nuts made of fiber-reinforced plastic have been proposed.

With respect to fiber-reinforced plastic nuts conventionally employed, they are generally produced by the following method: A yarn cloth of glass fibers, which has a thickness of 0.1 to 0.25 mm, is impregnated with a resin. The resin-impregnated yarn cloth is then squeezed by passing between rolls, so that the glass fiber content is adjusted to 60% by weight or so. Then, the resin-impregnated cloth is treated to render the resin half-cured. As a result, there is obtained a semi-rigid, substantially non-tacky material (prepreg). A plurality of several tens of such prepregs are piled up in a cavity of a mold, and then subjected to press-molding while heating, whereby a board-like shaped article is obtained. The thus obtained board-like article is cut into a piece having a predetermined shape and a predetermined dimension, followed by boring and threading to obtain a nut.

With the above-mentioned method, in which a yarn cloth having a thickness of 0.1 to 0.25 mm is employed, there cannot be obtained a nut having a sufficient mechanical strength, unless a thread is provided with a pitch of 1 to 2 mm. In the case of a nut of which the thread is provided with a pitch of 1 to 2 mm, the yarn clothes each having a thickness of 0.1 to 0.25 mm can extend into each of the thread and, hence, the reinforcement of the thread can be attained. A nut provided with a thread having a pitch of 1 to 2 mm is suitable for coupling with a bolt having a size of M10 to M25 (the size according to the Japanese Industrial Standards B0205), or larger, of which the thread is formed with a pitch of 1 to 2 mm. That is, with the above-mentioned method, a nut having a sufficient strength is obtained only when the production of a nut adapted to receive the thread portion of a bolt having a size of M10 to M25, or larger is intended. Further, this method has the following disadvantages. It is troublesome and takes a lot of time to pile up in a cavity of a mold a large number (generally, 30 to 80) of prepregs prior to pressing. In addition, it is required to use an expensive yarn cloth. Hence, according to the abovementioned conventional method, it is impossible to provide a nut which exhibits a high mechanical strength and can be produced with high productivity and at low cost.

SUMMARY OF THE INVENTION

Accordingly, it is one and primary object of the present invention to provide an internally threaded fiber-reinforced plastic member which exhibits a high mechanical strength and can be produced with high productivity and at low cost.

It is another object of the present invention to provide a method of producing an internally threaded fiber-reinforced plastic member of the kind as mentioned above, which can be easily conducted.

BRIEF DESCRIPTION OF THE DRAWINGS

These and other objects and advantages of the invention will become more apparent from the following detailed description and appended claims taken in connection with the accompanying drawings in which:

DETAILED DISCUSSION

Figure 1:
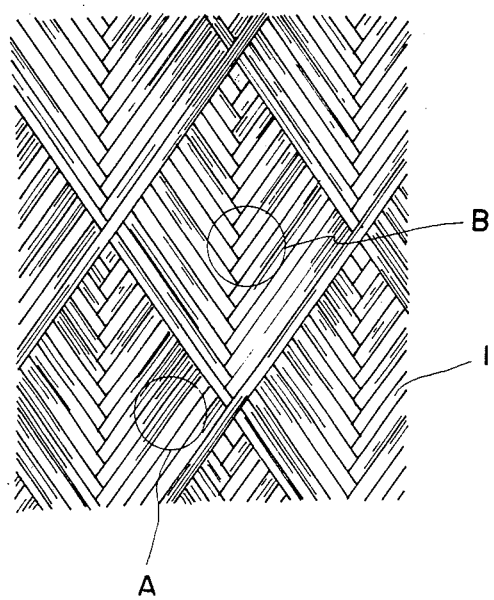
FIG. 1 is an enlarged, fragmentary plan view of a sheetlike molding material from which an internally threaded fiber-reinforced plastic member of the present invention is produced.

According to the present invention, there is provided an internally threaded fiber-reinforced plastic member comprising a hollow body having a body portion and a central bore constituted by a space formed within and extending longitudinally of the axis of the member and a thread formed integrally with the body on the inner surface of the central bore.

The body portion comprising at least one layer selected from:

(I) a layer comprising a plurality of resin-impregnated strands arranged substantially in parallel, (II) a double layer comprising a first unit layer composed of a plurality of resin-impregnated strands arranged substantially in parallel and a second unit layer composed of a plurality of resin-impregnated strands arranged substantially in parallel, the first unit layer and the second unit layer being piled one upon another such that the resin-impregnated strands of the first unit layer are crossed with those of the second unit layer at an angle ($\alpha$) defined by the formula $0 < \alpha \leq 90°$, and (III) a herringbone pattern layer comprising a plurality of first strand groups each comprising a of resin-impregnated strands arranged substantially in parallel and a plurality of second strand groups each comprising a plurality of resin-impregnated strands arranged substantially in parallel, the first strand groups cooperating with the second strand groups to form a herringbone pattern structure in which the first strand groups are crossed with the second strand groups at an angle ($\beta$) defined by the formula $5 \leq \beta \leq 90°$, provided that where the body portion is comprised of the layer (I) alone, the body portion comprises a plurality of the layers (I), and that where the body portion is comprised of a plurality of layers, the layers are laminated and unified such that the resin-impregnated strands of laminate-wise mutually adjacent layers are crossed with respect to each other at an angle ($\gamma$) defined by the formula $0 \leq \gamma \leq 90°$ except for the case in which where the laminate-wise mutually adjacent layers each are layers (I), the resin-impregnated strands of the laminate-wise mutually adjacent layers (I) are crossed with respect to each other at an angle ($\delta$) defined by the formula $0 < \delta \leq 90°$, the or each layer being arranged substantially in perpendicular relation to the axis of the member, each resin-impregnated strand comprising a plurality of fiber filaments and a thermohardened resin.

In the drawings, it should be noted that like numerals designate like parts or portions throughout FIGS. 1 to 9.

Figure 3:
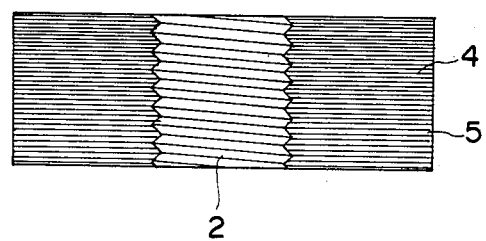
FIG. 3 is a vertical sectional view of an internally threaded fiber-reinforced plastic member according to the present invention.

As shown in FIG. 3, an internally threaded fiber-reinforced plastic member of the present invention has a body portion (not designated) and a central bore 2 extending longitudinally of the axis of the member. The body portion comprises a plurality of layers 4. Each of the layer 4 is at least one layer selected from a layer (I) which comprises a plurality of resin-impregnated strands arranged substantially in parallel; a double layer (II) which comprises a first unit layer composed of a plurality of resin-impregnated strands arranged substantially in parallel and a second unit layer composed of a plurality of resin-impregnated strands arranged substantially in parallel; and a herringbone pattern layer (III) which comprises a plurality of first strand groups each comprising a plurality of resin-impregnated strands arranged substantially in parallel and a plurality of second strand groups each comprising a plurality of resin-impregnated strands arranged substantially in parallel, in which the first strand groups are cooperating with the second strand groups to form a herringbone pattern structure. With respect to each of the layer (I), the double layer (II) and the herringbone pattern layer (III), each resin-impregnated strand comprises a plurality of fiber filaments and a thermohardened resin. In FIG. 3, numeral 5 designates a thermohardened resin. With respect to the double layer (II), the first unit layer and the second unit layer are piled one upon another such that the resin-impregnated strands of the first unit layer are crossed with the resin-impregnated strands of the second unit layer at an angle ($\alpha$) defined by the formula $0 < \alpha \leq 90°$. With respect to the herringbone pattern layer (III), the first strand groups are crossed with the second strand groups at an angle ($\beta$) defined by the formula $5 \leq \beta \leq 90°$.

According to the present invention, where the body portion is comprised of the layer (I) alone, the body portion comprises a plurality of the layers (I). In this case, the layers (I) are laminated and unified such that the resin-impregnated strands of laminate-wise mutually adjacent layers (I) are crossed with respect to each other at an angle ($\delta$) defined by the formula $0 < \delta \leq 90°$. On the other hand, when the body portion is comprised of a plurality of the double layers (II), the double layers (II) are laminated and unified such that the resin-impregnated strands of laminate-wise mutually adjacent layers (II) are crossed with respect to each other at an angle ($\gamma'$) defined by the formula $0 \leq \gamma' \leq 90°$. When the body portion is comprised of a plurality of herringbone pattern layers (III), the herringbone pattern layers (III) are laminated and unified such that the strand groups of the laminate-wise mutually adjacent layers are crossed with respect to each other at an angle ($\gamma''$) defined by the formula $0 \leq \gamma'' \leq 90°$. When the body portion comprises, in combination, at least one double layer (II) and at least one herringbone pattern layer (III), the body portion has the same laminate structure with respect to the angle at which resin-impregnated strands (or strand groups) of laminate-wise mutually adjacent layers are crossed with respect to each other as explained above referring to the case where the body portion comprises a plurality of the double layers (II) and the case where the body portion comprises a plurality of the herringbone pattern layers (III). Further, with respect to the cases where the body portion comprises, in combination, (1) at least one layer (I) and at least one double layer (II);
(2) at least one layer (I) and at least one herringbone pattern layer (III); or
(3) at least one layer (I), at least one double layer (II) and at least one herringbone pattern layer (III), the same explanation as made above in regard of the laminate structure with respect to the angle at which the resin-impregnated strands (or strand groups) of laminate-wise mutually adjacent layers are crossed with respect to each other can apply, except for a portion(s) where the layers (I) are arranged in a laminate-wise mutually adjacent relationship. In such portion(s), the angle at which the resin-impregnated strands of laminate-wise mutually adjacent layers (I) are crossed with respect to each other should exclude 0 (zero). In view of the mechanical strength of an internally threaded fiber-reinforced plastic member, each of the above-mentioned angles ($\alpha$), ($\beta$), ($\gamma'$), ($\gamma''$) and ($\delta$) is preferred to be 90°. With respect to the lamination of a plurality of the layers (I), the reason why the angle ($\delta$) should not be 0° is explained as follows. That is, if the angle ($\delta$) is 0°, reinforcement by the strands of fiber filaments is exerted only in a single direction. In such case, a sufficient effect of reinforcement by the strands of fiber filaments can hardly be attained.

The or each layer as mentioned above is arranged substantially in perpendicular relation to the axis of the member, as shown in FIG. 3. A thread formed on the inner surface of the central bore 2 may be any of the conventional threads whereby the central bore 2 is adapted to receive the thread portion of a mating externally threaded member, e.g., a bolt, having the same conventional thread.

With respect to each of the layers (I), (II) and (III), a more detailed explanation will be made below.

Now, referring back to FIG. 1, there is shown one preferred form of a sheet-like molding material from which an internally threaded fiber-reinforced plastic member of the present invention is produced. The sheet-like molding material as shown therein is one prepared by a method in which the filament winding technique is employed, which method will be mentioned later. In FIG. 1, numeral 1 designates a band of a plurality of resin-impregnated strands.

The double layer (II), which comprises a first unit layer and a second unit layer piled one upon another, corresponds to a layer constituting a portion designated as "A". Assuming that the second unit layer is a layer laid under the first unit layer, the second unit layer cannot be seen in the portion "A". In FIG. 1, the layer (I), which comprises a plurality of resin-impregnated strands arranged substantially in parallel, can be considered as the first unit layer shown in the portion "A", provided that the second unit layer is not present under the first unit layer. The herringbone pattern layer (III) corresponds to a layer constituting a portion designated as "B". As shown therein, a plurality of first strand groups cooperate with a plurality of second strand groups to form a herringbone pattern structure.

In one preferred embodiment of the present invention, the layers (I), (II) and (III) are prepared by a method in which the filament winding technique is employed (which will be mentioned later). In this case, each of the layer (I) and the unit layers constituting the double layer (II) has a structure in which a plurality of bands each comprising a predetermined number of resin-impregnated strands are arranged in a side-by-side relationship, and the layer (III) has a structure in which a plurality of first bands each comprising a predetermined number of resin-impregnated strands and a plurality of second bands each comprising a predetermined number of resin-impregnated strands cooperate with each other to form a herringbone pattern structure. In these cases, a plurality of bands are arranged in parallel, with every laterally mutually adjacent bands being substantially in contact with each other. Every laterally mutually adjacent bands may be slightly overlapped with each other. There may also be employed such an arrangement of bands that a small spacing is present between every laterally mutually adjacent bands, insofar as the presence of such small spacing brings about no adverse effect on the mechanical strength of the resulting internally threaded plastic member.

Figure 2:
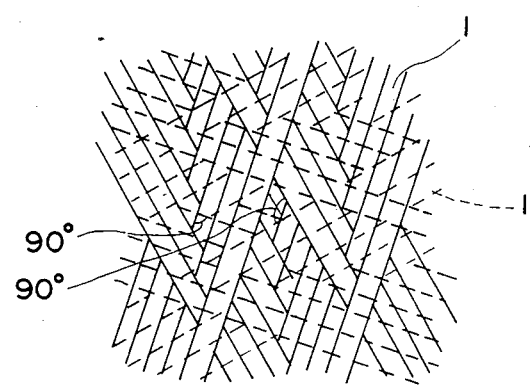
FIG. 2 is an enlarged, fragmentary plan view illustrating one preferred manner of lamination used in the present invention in which a couple of sheet-like molding materials are laminated such that the strands of fiber filaments of laminate-wise mutually adjacent molding materials are crossed with respect to each other at an angle of 90°.

Referring now back to FIG. 2, there is shown one preferred embodiment of the present invention with respect to the angle at which the resin-impregnated strands of laminate-wise mutually adjacent layers are crossed with respect to each other. For readiness in understanding, FIG. 2 shows a pair of sheet-like molding materials each obtained by the method in which the filament winding technique is employed, which will be explained later. As shown in FIG. 2, the bands of resin-impregnated strands 1, 1 of these two sheet-like molding materials are crossed with respect to each other at an angle of 90°.

In the internally threaded fiber-reinforced plastic member of the present invention, the fiber filaments and the thermohardened resin are present preferably at a volume ratio of 30/70 to 70/30.

In one preferred embodiment of the present invention, an internally threaded fiber-reinforced plastic member is produced by a method comprising:

(a) disposing in a cavity of a mold a sheet-like molding material or a plurality of said sheet-like molding materials laid one upon another, the sheet-like molding material being one obtained by a process comprising:

(i) subjecting one or plurality of resin-impregnated strands combined into a band to one or a plurality of cycles of helical windings to obtain on the surface of a mandrel a layer of helically wound resin-impregnated strands with a predetermined thickness, the or each resin-impregnated strand comprising a plurality of fiber filaments and thermo-hardening resin, the or each cycle of helical winding being defined as one or a plurality of unit windings for forming a complete pattern which is comprised of a plurality of first bands arranged in parallel with every laterally mutually adjacent bands being substantially in contact with each other and a plurality of second bands arranged in parallel with every laterally mutually adjacent bands being substantially in contact with each other and includes a herringbone pattern, the first and second bands being in cross relationship, the or each unit winding being effected at a helix angle of 45° to 87.5°, (ii) cutting the layer along the longitudinal axis of the mandrel, followed by developing the same into a sheet-like form, and (iii) cutting the sheet-like layer into one or a plurality of sections each having a predetermined shape, thereby to obtain one or a plurality of sheet-like molding materials;

(b) subjecting the sheet-like molding material or the plurality of sheet-like molding materials to press-molding while heating, thereby to obtain a composite fiber-reinforced plastic sheet, (c) cutting out from the composite fiber-reinforced plastic sheet a piece having a desired shape and a desired dimension, with the axis of the piece being substantially perpendicular to the composite fiber-reinforced plastic sheet, (d) forming a bore throughout the axial length of said piece, and (e) threading the inner surface of said bore.

Figure 6:
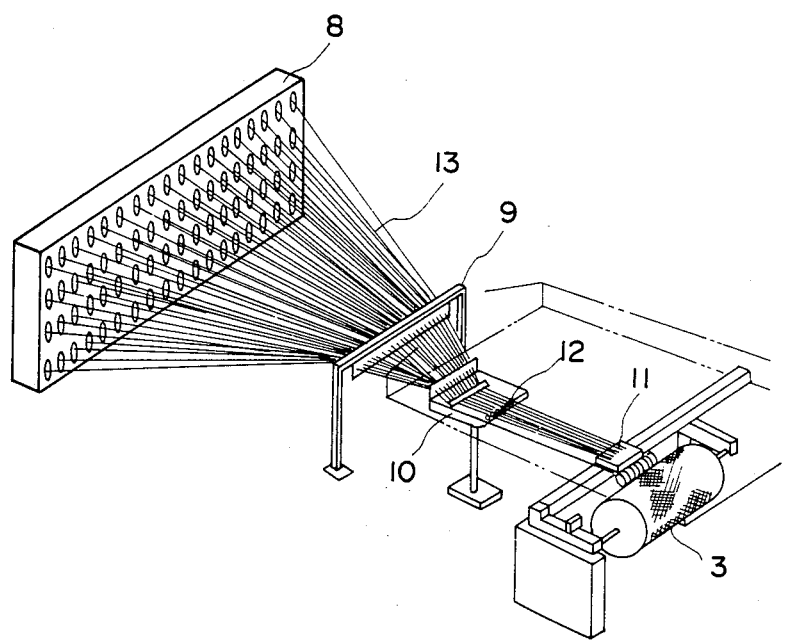
FIG. 6 is a schematic perspective view of a filament winding machine to be used in the method of the present invention.

The above-mentioned method will be explained below in detail. In FIG. 6, there is given a schematic illustration of the apparatus to be employed in the above-mentioned method.

A plurality of strands of fiber filaments 13 is withdrawn from a creel 8 through a guide 9 into a resin bath 10 where the strands are impregnated with the resin. Then, each strand is passed through each of carbide dies 12 having a predetermined diameter and aligned along one side of the resin bath, thereby to adjust the amount of the resin carried by each strand to an appropriate value. After passing through the dies 12, each resin-impregnated strand is passed through a comb-like guide (not shown) and a semicircular guide (not shown) which are provided on a traversing carriage 11. The strands are combined into a band having a predetermined width. The strands are combined into a band such that the distance between every laterally adjacent strand becomes zero (0). Then, the end of the band is suitably secured to one end portion of a mandrel 3. The mandrel 3 is then caused to rotate at a given rate, and as the mandrel 3 rotates, the traversing carriage 11 moves laterally, back and forth, along the longitudinal axis of the mandrel, whereby the band is helically wound around the mandrel 3.

Meanwhile, employment of only one strand of fiber filaments is also possible.

Figure 4:
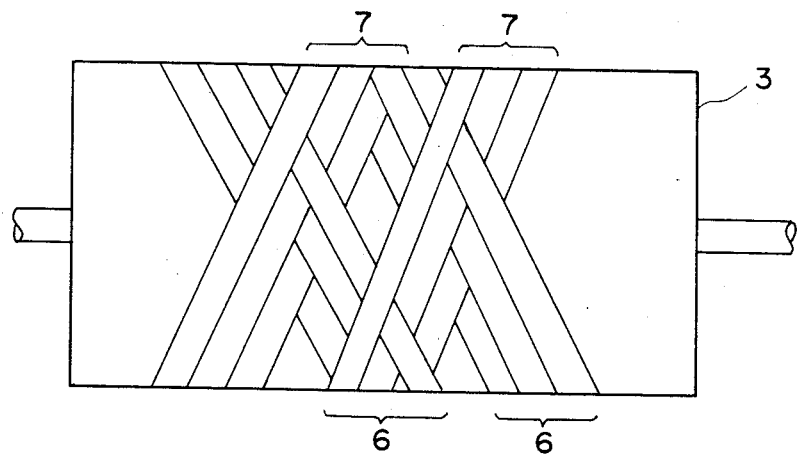
FIG. 4 is an elevational view of a mandrel with bands of fiber filament strands being partially wound therearound, showing the intermediate stage of the course of helical winding.
Figure 5:
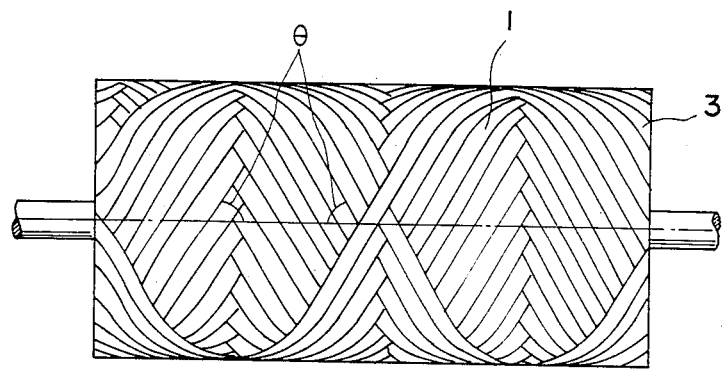
FIG. 5 is an elevational view of a mandrel, on which a complete pattern of bands of fiber filament strands is formed.

By a plurality of reciprocations of the traversing carriage 11, the band is subjected to a plurality of unit windings forming on the surface of the mandrel a cross pattern which is comprised of a plurality of first bands 6 and a plurality of second bands 7, and includes therein a herrigbone pattern formed by crossing of the first band 6 and the second band 7, as shown in FIG. 4. The term "unit winding" means winding around the mandrel effected by one-time reciprocal movement of the carriage 11. In FIG. 4, the first bands 6 and the second bands 7 are respectively so arranged that every laterally mutually adjacent bands are substantially in contact with each other. According to the present invention, by effecting one or a plurality of unit windings, one cycle of helical winding is attained. Completion of one cycle of helical winding gives on the surface of the mandrel a complete pattern which is comprised of a plurality of first bands arranged in parallel and a plurality of second bands arranged in parallel and includes therein a herringbone pattern, the first and second bands being in cross relationship. There may be a case where only one unit winding gives on the surface of the mandrel a complete pattern. However, the above case is very rare. Usually, a complete pattern is formed by effecting a plurality of unit windings. The complete pattern formed on the surface of the mandrel 3 by one cycle of helical winding is shown in FIG. 5. In such a complete pattern, every laterally mutually adjacent bands are substantially in contact with each other, or slightly overlapped with each other. Unless no adverse effect is exerted on the mechanical strength of an internally threaded member, there may be a small spacing between every laterally adjacent band. Upon one or a plurality of cycles of helical windings, there can be obtained on the surface of the mandrel a layer of helically wound resin-impregnated strands having a predetermined thickness.

In FIG. 5, $\theta$ designates a helix angle. The term "helix angle" used herein is intended to mean the acute angle created by the intersection of the band on the body of the mandrel with a line on the body of the mandrel parallel to the longitudinal axis of the mandrel. According to the present invention, the unit winding of the band should be effected at a helix angle of 45° to 87.5° for the reason as will be mentioned later.

The shape of the cross section of the mandrel is generally circular. According to the present invention, a cylindrical mandrel having a diameter of about 50 cm to 200 cm and a length of about 1 m to 6 m is generally used. However, a mandrel of which the cross section is polygonal may also be used.

After completion of the winding, i.e., when a layer of helically wound resin-impregnated strands with a predetermined thickness is formed on the surface of the mandrel, the layer on the mandrel is cut by means of an appropriate cutting means along the longitudinal axis of the mandrel, and then developed into a sheet-like form. The thickness of the layer to be formed on the mandrel is varied according to purpose, diameter of the mandrel, and the like, but generally about 3 mm to 10 mm. The method of preparing such a layer of resin-impregnated strands by the filament winding technique is known from, for example, Japanese Patent Application Publication Nos. 54-30422 and 54-35232 published Oct. 1, 1979 and Nov. 1, 1979, respectively, and Japanese Patent Application Laid-Open Specification Nos. 55-103925 and 55-103926 now U.S. Pat. Nos. 4,220,497 and 4,220,496, respectively. The layer is then subjected to heating to change the state of the resin to "B-stage". The "B-stage" means an intermediate stage involved in the curing reaction of a thermosetting resin, in which stage, the resin softens but does not fuse when heated. By changing the state of the resin to the B-stage, squeezing out of an excess amount of the resin at the time of press molding can be avoided. The conditions employed for changing the state of the resin to the "B-stage" may be varied according to the kind of the resin. The layer is then cut into a plurality of sections each having a predetermined shape, thereby to obtain a plurality of sheet-like molding materials. One or a plurality of the so-formed sheet-like molding materials are disposed in a cavity of a mold, and subjected to press-molding while heating to obtain a composite sheet. The press-molding may generally be carried out under a pressure of 30 to 100 Kg/cm$^2$, preferably 50 to 80 Kg/cm$^2$ at a temperature of 100° to 150° C., preferably 110° to 120° C. for 30 minutes to 90 minutes, preferably about 60 minutes. A piece with a suitable shape and a suitable dimension is cut out from the composite sheet, with the axis of the piece being substantially perpendicular to the composite sheet. The piece is then subjected to boring to form a central bore extending in an axial direction thereof. Thereafter, the inner surface of the central bore is subjected to threading. Threading may be effected by any conventional threading technique, e.g. by tapping.

In case a plurality of sheet-like molding materials are subjected to press-molding, it is preferred that they be so laminated that the strands of laminate-wise mutually adjacent sheet-like molding materials are crossed with respect to each other at an angle of 90°, as shown in FIG. 2. This is so because an internally threaded member produced from the composite sheet having such a laminate structure is very excellent in mechanical strength. However, the manner of lamination of a plurality of sheet-like molding materials is not limited to the above, i.e., a plurality of sheet-like molding materials may be so laminated that the resin-impregnated strands of laminate-wise mutually adjacent molding materials are crossed with respect to each other at an angle ranging from 0° to 90°.

The winder for effecting helical winding may be any commercial winder. For example, a WII type filament winding machine of Maclean Anderson Co., U.S.A. may be used. The winders incorporate various gear settings or electrical controls which may be regulated to produce a desired helix angle and a desired laydown pattern. Where a plurality of strands are employed, the strands are combined into a band of which the width is about 0.5 cm to 20 cm. The fineness of the strand is generally in the range of about 200 to 17,600 Tex. The number of strands employed for forming a band is generally 1 to 100, preferably 1 to 50.

As the fiber filament to be used in the present invention, there may be mentioned glass fiber filaments, carbon fiber filaments, aramid fiber filaments, boron fiber filaments, silicon carbide filaments, and the like. However, it is preferred to employ fiber filaments each having a modulus in tension of 6000 Kg/mm$^2$ to 120000 Kg/mm$^2$ and a tensile strength of 100 Kg/mm$^2$ to 550 Kg/mm$^2$. From the economical point of view, glass fiber filaments are most preferred, due to its availability at low cost.

As the thermosetting resin to be used in the present invention, there may be mentioned epoxy resins, unsaturated polyester resins, epoxy acrylate resins, phenolic resins, and the like. Preferred are epoxy resins. However, any of other thermosetting resins may be used according to need. The viscosity of the resin is generally 0.1 to 15 poises, preferably 1 to 5 poises. When epoxy resins are used, there may be incorporated a curing agent. As the curing agent, there may be employed acid anhydride such as methyltetrahydrophthalic anhydride, MHA (methyl himic anhydride), HHPA (hexahydrophthalic anhydride), PA (phthalic anhydride), THPA (tetrahydrophthalic anhydride), MHHPA (methylhexahydrophthalic anhydride), NMA (nadic methyl anhydride); aliphatic polyamines, such as tetraethylene pentamine, tetraethylene tetramine and Alaldite HT-830 and HY-850 (trade name of aliphatic polyamine manufactured by CIBA); and aromatic polyamines. Further, a curing accelerator may be incorporated. As the curing accelerator, there may be employed N-(4'-methoxybenzylidene)-4-alkylamine (of which the alkyl moiety has 4 to 7 carbon atoms), 1-benxyl-2-methyl imidazole, 2-ethyl-4-methyl imidazole, 2,4,6-tris(dimethylaminomethyl)phenol or tetradecyldimethylbenzyl ammonium chloride. Still further, an additive may be incorporated in the resin. As examples of the additive, there may be mentioned calcium carbonate, alumina, clay, molten silica, glass powder, glass fiber powder and pigments. The temperature of the resin is varied according to the kind of resin, but generally, the temperature of the resin is in the range of from room temperature to 40° C.

The fiber filaments and the thermohardened resin are present in the resin-impregnated strand at a volume ratio of 30/70 to 70/30, preferably 50/50 to 63/37. Such a volume ratio of the fiber filaments and the thermohardened resin in the resin-impregnated strand can be attained by passing each strand leaving the bath through each of the dies 12 having a predetermined diameter, whereby the weight amount ratio of the resin to unimpregnated strands is adjusted to an appropriate value. The relationship between the weight ratio and the volume ratio will be given later. If the amount of the fiber filaments in the resin-impregnated strands is less than 30 percent by volume, the reinforcing effect attained by the fiber filaments is insufficient. On the other hand, if the fiber filaments are present in an amount larger than 70 percent by volume, it is impossible to render the fiber filaments embedded in a resin matrix.

The helix angle should be in the range of 45° to 87.5°. The winding at a helix angle smaller than 45° is disadvantageous, since the winding operation at such small helix angle is difficult. Further, a sheet-like molding material obtained by effecting winding at a helix angle smaller than 45° has a pattern which is substantially the same as that of a sheet-like molding material obtained by effecting winding at a helix angle corresponding to the complementary angle of such small helix angle, i.e., less than 45°. Therefore, it is meaningless to take the trouble to effect winding at such small helix angle.

On the other hand, when the helix angle is larger than 87.5°, the first band and the second band are caused to be arranged almost in parallel. In such case, when a plurality of sheet-like molding materials, each prepared by effecting winding at such helix angle, are piled up such that the first bands and the second bands of laminate-wise mutually adjacent sheet-like molding materials are respectively oriented in the same direction, an internally threaded member finally obtained is poor in mechanical strength.

Figure 7:
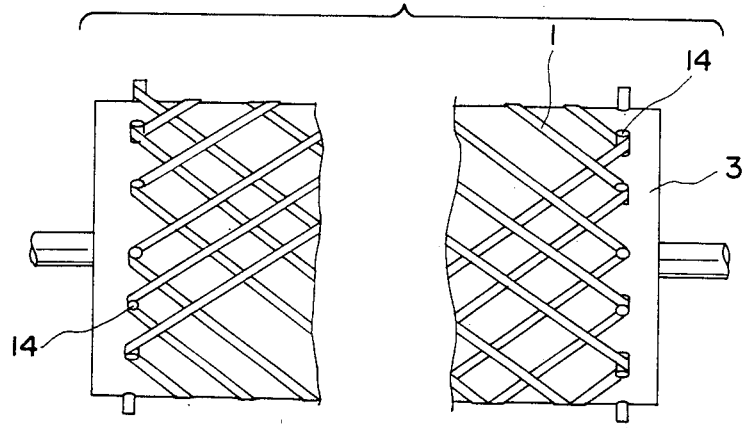
FIG. 7 is a partially cut-away elevational view of a mandrel which is equipped with a plurality of pins.

When the helix angle is 45° to 60°, the bands are apt to slip on the mandrel at both end portions thereof in changing the direction of winding or in turning the direction of lateral movement of the traversing carriage. In this case, it is necessary to provide a plurality of pins 14 or bolts made of iron at both end portions of the mandrel, as shown in FIG. 7.

From the standpoint of ease in winding operation, the helix angle of 75° to 85° is preferred. In addition, a sheet-like molding material obtained by effecting winding at such a large helix angle of 75° to 85° has such an advantage that, during the course of press-molding, the first band and the second band each can slip outwardly in a direction perpendicular to the longitudinal direction of the band so as to widen the angle defined by the inward side of the first band and that of the second band and, hence, in disposing such molding material in the cavity of a mold, even if it is so disposed that there is a small spacing left between each of both sides of the molding material and the wall of the cavity, the first band and the second band each slip outwardly in the above-mentioned direction during the course of the press-molding, whereby the cavity is finally fully filled with the molding material.

In view of the mechanical strength of an internally threaded member, the helix angle of 45° is most preferred. However, as stated before, winding at a helix angle of 45° is relatively troublesome due to need for provision of pins for preventing bands from slipping on the mandrel.

In another embodiment of the present invention, an internally threaded fiber-reinforced plastic member is produced by the method which comprises:

(a) laying a plurality of sheet-like molding materials one upon another and disposing the same in a cavity of a mold, the sheet-like molding materials being obtained by cutting an unidirectional prepreg sheet into a plurality of sections each having a predetermined shape, the unidirectional prepreg sheet comprising a plurality of resin-impregnated strands arranged substantially in parallel, the resin-impregnated strands each comprising a plurality of fiber filaments and a semi-cured thermohardening resin, the laying of the plurality of sheet-like molding materials one upon another being effected such that the resin-impregnated strands of laminate-wise mutually adjacent sheet-like molding materials are crossed with respect to each other at an angle defined by the formula $0 < \lambda \leq 90°$, (b) subjecting the plurality of sheet-like molding materials laid one upon another to press-molding while heating, thereby to obtain a composite fiber-reinforced plastic sheet, (c) cutting out from the composite fiber-reinforced plastic sheet a piece having a desired shape and a desired dimension, with the axis of the piece being substantially perpendicular to the composite fiber-reinforced plastic sheet, (d) forming a bore throughout the axial length of the piece, and (e) threading the inner surface of the bore.

With respect to the above-mentioned method, the "unidirectional prepreg" used as the molding material is well known in the art, and described in many publications. The general teaching of the prepregs are given in "Handbook of Reinforced Plastics", pp 89-92, edited by Association For Reinforced Plastic Engineering, Japan, which is incorporated herein as a reference. With respect to the method of producing an unidirectional prepreg, various methods are known. Generally, these methods can be classified into two groups, i.e., (1) a method in which fiber filaments are impregnated in a liquid resin composition; and (2) a method in which fiber filaments are impregnated in a resin solution prepared by dissolving in a solvent a liquid or solid resin composition. An unidirectional prepreg to be employed in the present invention may be advantageously prepared by the latter method (2), but not limited thereto. As one example of the latter method, there can be mentioned a method disclosed in the Japanese Patent Application Laid-Open Specification No. 50-105772. It is also possible to produce an unidirectional prepreg sheet by using the filament winding technique. In this case, an unidirectional prepreg can be prepared, for example, by the following method: A predetermined number of strand of fiber filaments is impregnated in a resin solution obtained by dissolving a resin in a solvent therefor, and the resin-impregnated strand(s) is then wound around the mandrel circumferentially from one end of the mandrel to the other end thereof in a predetermined direction, thereby to obtain a layer of resin-impregnated strand(s) on the surface of the mandrel. The layer is then heated to remove the solvent, followed by cutting the layer along the longitudinal axis of the mandrel to remove it from the mandrel, whereby an unidirectional prepreg sheet, in which a plurality of strands of fiber filaments are arranged substantially in parallel, is obtained. The winding angle, i.e., an angle at which the strand(s) of fiber filaments is wound around the mandrel may preferably be 70° to 90° relative to the longitudinal axis of the mandrel.

As will be readily understood from the above explanation, an internally threaded fiber-reinforced plastic member of the present invention is comprised of at least one crossing pair of unified groups of resin-impregnated fiber filament strands, each group comprising a plurality of strands of fiber filaments arranged substantially in parallel. An internally threaded plastic member of the present invention which has such unique interior structure can enjoy a remarkably excellent mechanical strength, due to attainment of sufficient reinforcement effect by fiber filaments, both in the body portion and thread.

The present invention further provides simplified method of producing an internally threaded fiber-reinforced plastic member by using the filament winding technique. In contrast to the conventional method in which an expensive yarn cloth is used and a number of prepreg sheets as molding materials prepared therefrom are piled up for press-molding, according to the method of the present invention, a sheet-like molding material with a sufficient thickness can be obtained readily and simply by winding resin-impregnated strands of fiber filaments around the mandrel, and, hence, the troublesome piling of a large number of molding materials involved in the conventional yarn cloth prepreg method can be eliminated, and, further, use of fiber filaments which are inexpensive as compared with a yarn cloth leads to great reduction of the production cost.

PREFERRED EMBODIMENTS

The present invention will be illustrated in more detail with reference to the following Examples that should not be construed as limiting the scope of the invention.

In the meantime, the weight ratio of the fiber filaments to the thermohardened resin in an internally threaded member can be measured by the the following method. An internally threaded member is subjected to heat treatment to burn the thermohardened resin off. The heat treatment is effected at such a temperature condition that the thermohardened resin is burnt off but the fiber filaments are left as they are. After the thermohardened resin is burnt, the fiber filaments are weighed. The weight percentage of the fiber filaments in the internally threaded member can be obtained by calculating the equation:

$$G_w = \frac{W_g}{W_f} \times 100(\%)$$

$G_w$: weight percentage of fiber filaments
$W_f$: weight of internally threaded member
$W_g$: weight of fiber filaments The weight percentage of the thermohardened resin in the internally threaded member can be obtained by calculating the equation:

$$R_w = \frac{W_I - W_g}{W_I} \times 100(\%)$$

$R_w$: weight percentage of thermohardened resin
$W_I$, $W_g$: as defined above.

As stated before, according to the present invention, the fiber filaments and the thermohardened resin are present in the internally threaded member at a volume ratio of 30/70 to 70/30. Meanwhile, the conversion of weight percent to volume percent can be made using the following equation:

$$G_v = \frac{100\rho_r \cdot G_w}{100\rho_g - G_w(\rho_g - \rho_r)}$$

$G_v$: volume percentage of fiber filaments
$G_w$: weight percentage of fiber filaments
$\rho_g$: specific gravity of fiber filament
$\rho_r$: specific gravity of thermohardened resin.

EXAMPLES 1 and 2 and COMPARATIVE EXAMPLE 1

24 Glass fiber filament strands having a fineness of 2009 Tex (No. 1062-15, manufactured and sold by PPG Industries, Inc., U.S.A.) were drawn into a resin bath containing 100 parts by weight of AER 354 (trade name of an epoxy resin manufactured and sold by Asahi Kasei Kogyo K.K., Japan), 75 parts by weight of HN 2200 (trade name of methyltetrahydrophthalic anhydride manufactured and sold by Hitachi Chemical Co., Ltd. Japan) as a curing agent and 2 parts by weight of ATC-3 (trade name of N-(4'-methoxybenzylidene)-4-alkylaniline of which the alkyl moiety has 4 to 7 carbon atoms manufactured and sold by ICI Japan Ltd., Japan) as a curing accelerator, whereby the strands were impregnated with the resin. Each of the strands was withdrawn from the bath and passed through a carbide die having a diameter of 1.26 mm, whereby the amount of the resin carried by the strand was adjusted to 23±1% by weight based on the total weight of the resin and the strand. Then, the strands were combined into a band having a width of 6.4 cm through a comb-like guide and a semicircular guide located on a traverse carriage, and the band was uniformly wound around a rotating cylindrical mandrel having a diameter of 92 cm and a length of 180 cm at a helix angle of 85°, thereby forming a layer of the resin-impregnated strands on the surface of the mandrel. The layer of the strands was then cut along the longitudinal axis of the mandrel, and developed into a sheet-like form. The weight of the layer was 12 kg per 1 m².

The thus-obtained sheet-like layer was allowed to stand at 40° C. for eight hours so that the state of the resin included in the layer was changed to B-stage. The sheet-like layer is then cut into a plurality of sections (30 cm×30 cm). Three sections were taken out and then piled up in a mold heated to 125° C. and having a cavity of 30 cm in length, 30 cm in width and 5 cm in depth in such a manner that the first bands and the second bands of every laminate-wise adjacent sections were respectively oriented in the same direction, followed by press-molding under a pressure of 50 Kg/cm² for one hour to obtain a composite sheet (hereinafter referred to as "Sheet A").

On the other hand, another set of three sections were taken out from the above-obtained plurality of sections. These sections were then piled up in the same mold as employed above in such a manner that the first bands and the second bands of the section disposed in the middle were respectively crossed with the first bands and the second bands of the other two sections at an angle of 90°, followed by press-molding under the same conditions as mentioned above. As a result, there was obtained another composite sheet (hereinafter referred to as "Sheet B").

The thicknesses of the above-obtained sheets were 15 mm and 15.5 mm, respectively. Five square-shaped pieces (22 mm×22 mm) were cut out from each of the above-obtained composite sheets, and each of these pieces was subjected to boring by means of a drill, thereby forming a central bore extending in an axial direction thereof. The inner surface of the bore formed in each piece was subjected to threading by means of a tap, so that a thread adapted to receive a thread of a M10 bolt (pitch: 1.5 mm) was provided thereon. As a result, five nuts were obtained from each of Sheet A and Sheet B.

For the purpose of comparison, four nuts each having a thread adapted to receive a thread of a M10 bolt (pitch: 1.5 mm) was prepared in substantially the same manner as described above, except that NIKOLYTE NL-EG(G10) (trade name of a glass yarn cloth laminate manufactured and sold by NIKKO KASEI Co., Ltd., Japan) having a thickness of 15 mm (hereinafter referred to as "Sheet C") was used instead of Sheet A and Sheet B. Sheet C was one prepared by pressing a laminate of 64 prepreg sheets of glass yarn cloth.

Figure 8:
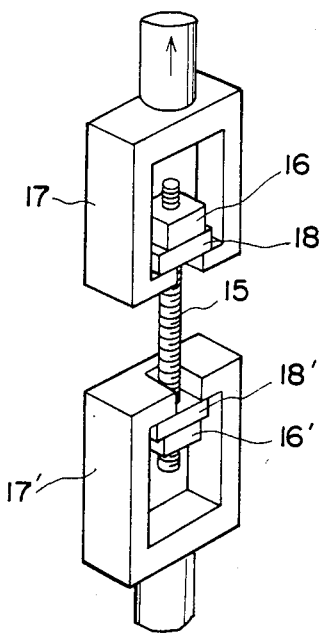
FIG. 8 is a schematic perspective view of an apparatus used for measuring the tensile strength of an internally threaded member.

With respect to each of the above-obtained nuts, the tensile strength was measured using a testing device shown in FIG. 8. The method of measuring the tensile strength will be briefly explained below referring to FIG. 8. A load cell (not shown) is provided above an upper jig 17. Both the jigs 17 and 17' are pulled in opposite directions so that pulling force is applied to a bolt 15 and to nuts 16 and 16' (same nuts) through spacers 18 and 18'. The pulling force is increased until the thread of one or each of the nuts is crushed or the bolt body is broken. A load at which the crushing of the thread of one or each of the nuts or the breaking of the bolt body occurs is measured by means of the load cell.

The bolt used for determining the tensile strength of the nuts was a M10 bolt (pitch: 1.5 mm) which was prepared by a method comprising impregnating a yarn cloth with a solution of a thermohardening resin in a solvent therefor, heating the above-obtained resin impregnated cloth to remove the solvent, thereby to obtain a half-cured, substantially non-tacky prepreg sheet, rolling the thus obtained prepreg sheet, heating and pressing the rolled prepreg sheet in a mold to prepare a rigid rod having a circular cross-section, and threading the surface of the rigid rod. The diameter and the length of the bolt was 10 mm and 120 mm, respectively.

The results obtained are shown in Table 1.

TABLE 1

| Sample No. | Tensile strength (ton) | Elongation at the time of break (mm) | Broken portion |
| --- | --- | --- | --- |

Present

TABLE 1-continued

| | Sample No. | Tensile strength (ton) | Elongation at the time of break (mm) | Broken portion |
|---|---|---|---|---|
| Invention | | | | |
| Nuts prepared | 1 | 1.65 | 2.95 | bolt body |
| from Sheet A | 2 | 1.75 | 2.98 | " |
| (thickness: | 3 | 1.50 | 3.13 | thread of nut |
| 15 mm) | 4 | 1.40 | 2.38 | bolt body |
| | 5 | 1.40 | 2.53 | thread of nut |
| | average | 1.54 | 2.79 | — |
| Nuts prepared | 1 | 1.60 | 2.58 | thread of nut |
| from Sheet B | 2 | 1.45 | 2.33 | bolt body |
| (thickness: | 3 | 1.25 | 1.90 | thread of nut |
| 15.5 mm) | 4 | 1.60 | 2.83 | " |
| | 5 | 1.50 | 2.78 | 41 |
| | average | 1.48 | 2.48 | — |
| Comparative | | | | |
| Nuts prepared | 1 | 1.10 | 1.85 | thread of nut |
| from Sheet C | 2 | 1.10 | 2.65 | " |
| (thickness: | 3 | 1.25 | 2.63 | " |
| 15 mm) | 4 | 1.15 | 2.50 | " |
| | average | 1.15 | 2.41 | — |

As is apparent from the above, the internally threaded members (nuts) of the present invention are high in tensile strength, as compared with nuts prepared according to the conventional method in which prepregs of glass yarn cloth are used.

EXAMPLES 3, 4 and 5

24 Glass fiber filament strands having a fineness of 2009 Tex (No. 1062-15, manufactured and sold by PPG Industries, Inc., U.S.A.) were drawn into a resin bath containing 100 parts by weight of an epoxy resin mixture [4:1=AER 331 (trade name of an epoxy resin manufactured and sold by Asahi Kasei Kogyo K.K. Japan): DER 438 (trade name of an epoxy resin manufactured and sold by Dow Chemical, U.S.A.) (weight ratio)], 75 parts by weight of HN 2200 as the curing agent and 2 parts by weight of ATC-3 as the curing accelerator, whereby the strands were impregnated with the resin. The strands were withdrawn from the bath and each strand was passed through a carbide die having a diameter of 1.26 mm, whereby the amount of the resin carried by the strand was adjusted to 23% by weight based on the total weight of the resin and the strand. Then, the strands were combined into a band having a width of 6.4 cm through a comb-like guide and a semicircular guide located on a traverse carriage, and the band was uniformly wound around a rotating cylindrical mandrel having a diameter of 92 cm and a length of 180 cm at a helix angle of 75°, thereby forming a layer of the resin-impregnated strands on the surface of the mandrel. The layer of the strands was then cut along the longitudinal axis of the mandrel, and developed into a sheet-like form. The weight of the layer was 12 Kg per 1 m².

The state of the resin contained in the sheet-like layer was changed to the B-stage in the same manner as employed in Examples 1 and 2. Then, the layer was cut into a plurality of sections (48 cm×48 cm). Three sections were taken out and piled up in a mold heated to 120° C. and having a cavity of 50 cm in length, 50 cm in width and 5 cm in depth in such a manner that the first bands and the second bands of every laminate-wise adjacent sections were respectively oriented in the same direction, followed by press-molding under a pressure of 80 Kg/cm² for one hour. Thus, there was obtained a composite sheet having a thickness of 16 mm (hereinafter referred to as "Sheet D").

Another composite sheet (hereinafter referred to as "Sheet E") was prepared in substantially the same manner as employed in preparation of Sheet D, except that the winding of the strands was effected at a helix angle of 85°.

Still another composite sheet (hereinafter referred to as "Sheet F") was prepared in substantially the same manner as employed in preparation of Sheet E, except that the three sections taken out from the sheet-like layer were piled in such a manner that the first bands and the second bands of the section disposed in the middle were respectively crossed with the first bands and the second bands of the other two sections at an angle of 90°.

The thickness of each of the above-obtained sheets was 16 mm. From each of these sheets, four square-shaped pieces (22 mm×22 mm) were taken out. Each of these pieces was subjected to boring by means of a drill, thereby forming a central bore extending in an axial direction thereof. The inner surface of the bore formed in each piece was subjected to threading by means of a tap, so that a thread adapted to receive a thread of a M12 bolt (pitch: 1.75 mm) was provided thereon. As a result, four nuts were obtained from each of Sheet D, Sheet E and Sheet F.

Figure 9:
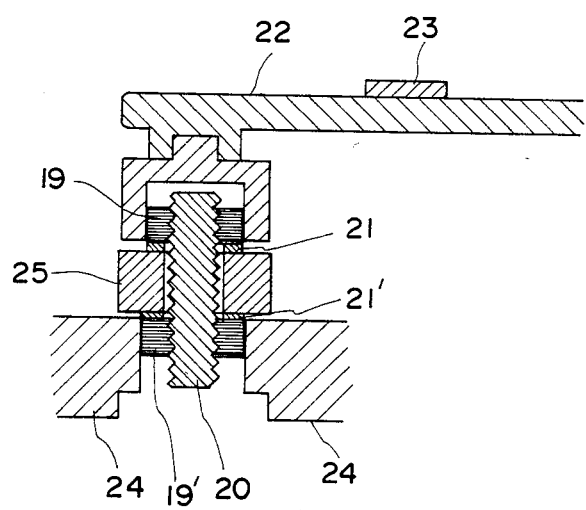
FIG. 9 is a schematic elevational view of an apparatus used for measuring the torque strength of an internally threaded member.

With respect to each of the above-obtained nuts, the torque strength was measured using a testing device shown in FIG. 9. The method of measuring the torque strength will be briefly explained below with reference to FIG. 9.

Two nuts (same nuts) 19 and 19' to be examined are screwed on both end portions of an iron-made M12 bolt (pitch: 1.75 mm), with a pair of washers 21 and 21' provided thereunder. Numeral 25 designates a spacer. The nut 19 is tightened by a torque wrench 22, while the nut 19' is fixed by a vice 24. Torque is increased until the thread of one or each of the nuts 19, 19' is broken, and the torque at which the thread is broken is measured by a meter 23. The torque strength is defined as a torque at which breaking of the thread of one or each of the nuts occurs.

The results obtained are shown in Table 2.

TABLE 2

| | Sample No. | Found torque strength (kg/cm) | Average torque strength (kg/cm) |
|---|---|---|---|
| Nuts prepared from | 1 | 850 | 913 |
| Sheet D | 2 | 1100 | |
| (thickness: 16 mm) | 3 | 900 | |
| | 4 | 800 | |
| Nuts prepared from | 1 | 800 | 975 |
| Sheet E | 2 | 900 | |
| (thickness: 16 mm) | 3 | 1000 | |
| | 4 | 1200 | |
| Nuts prepared from | 1 | 1700 | 1613 |
| Sheet F | 2 | 1700 | |
| (thickness: 16 mm) | 3 | 1450 | |
| | 4 | 1600 | |

As is apparent from the results, the nuts prepared from Sheet F, which was obtained by piling three sections in such a manner that the first bands and the second bands of the section disposed in the middle were respectively crossed with the first bands and the second bands of other two sections at an angle of 90°, exhibit higher torque strengths than those of nuts prepared from Sheet D and Sheet E.

EXAMPLES 6 and 7

Sheet G and Sheet H were prepared in substantially the same manner as employed in preparation of Sheet A in Example 1, except that carbon fiber filament strands (No. 6K, manufactured and sold by Asahi Nihon Carbon, Co., Japan) were used instead of glass fiber filament strands. The thicknesses of Sheet G and Sheet H were 10 mm and 20 mm, respectively. Five square-shaped pieces (22 mm × 22 mm) were cut out from each of the above-obtained composite sheets, and each of these pieces was subjected to boring by means of a drill, thereby forming a central bore extending in an axial direction thereof. The inner surface of the bore formed in each piece was subjected to threading by means of a tap, so that a thread adapted to receive a thread of a M12 bolt (pitch: 1.75 mm) was provided thereon. As a result, five nuts were obtained from each of Sheet G and Sheet H.

The so-obtained nuts were subjected to the measurement of the torque strength by the same method as mentioned in Examples 3, 4 and 5. The results obtained are shown in Table 3.

TABLE 3

|  | Sample No. | Found torque strength (kg/cm) | Average torque strength (kg/cm) |
| --- | --- | --- | --- |
| Nuts prepared from | 1 | 650 | 596 |
| Sheet G | 2 | 550 |  |
| (thickness: 10 mm) | 3 | 600 |  |
|  | 4 | 580 |  |
|  | 5 | 600 |  |
| Nuts prepared from | 1 | 800 | 980 |
| Sheet H | 2 | 800 |  |
| (thickness: 20 mm) | 3 | 1100 |  |
|  | 4 | 1000 |  |
|  | 5 | 1200 |  |

EXAMPLE 8 and COMPARATIVE EXAMPLE 2

A strand of carbon filaments (manufactured and sold by Asahi Nihon Carbon Co., Japan) was immersed in a solution comprising 100 parts by weight of Epikote B X 210 (trade name of an epoxy resin manufactured and sold by Shell Chemical Co., Japan), 3 parts by weight of a complex compound of boron trifluoride and monoethylamine as the curing agent and 70 parts by weight of methyl ethyl ketone as the solvent. The strand was then circumferentially wound around a rotating cylindrical mandrel having a diameter of 50 cm and having its surface covered with a mold-releasable sheet. The winding was effected from one end of the mandrel to the other end thereof with such a pitch that the spacing between every adjacent turns is 1 mm, whereby a layer of circumferentially wound strand was obtained on the surface of the mandrel. After completion of the winding, the circumferentially wound strand was allowed to stand at 40° C. until the amount of methyl ethyl ketone was decreased to 1% or less. Thereafter, the layer was cut along the longitudinal axis of the mandrel, and developed into a sheet-like form. The thus-obtained sheet-like layer comprised a plurality of strands arranged substantially in parallel. The sheet-like layer was then covered by a mold-releasable sheet, and then subjected to pressing by means of a press roll at a linear pressure of 5.5 Kg/cm, whereby an unidirectional prepreg sheet was obtained.

The above-obtained sheet was then cut into a plurality of square-shaped sections (16 cm × 7 cm), and 60 sections were piled up in a square-shaped recess (16 cm × 7 cm) formed in the center of an iron-made, board-like spacer (30 cm × 30 cm × 12 mm) which is provided on a flat mold. The mold was heated to 175° C. The sections were so arranged that the strands of every laminate-wise adjacent sections were crossed with respect to each other at an angle of 90°. Then, the 60 sections were press-molded under a pressure of 312.5 Kg/cm² for one hour, thereby to obtain a composite sheet (hereinafter referred to as "Sheet I").

Sheet J was prepared in substantially the same manner as mentioned above, except that the 60 sections were piled up such that the strands of every laminate-wise adjacent sections were oriented in the same direction.

Five square-shaped pieces (22 mm × 22 mm) were cut out from Sheet I, and each of these pieces was subjected to boring by means of a drill, thereby forming a central bore extending in an axial direction thereof. The inner surface of the bore formed in each piece was subjected to threading by means of a tap, so that a thread adapted to receive a thread of a M12 bolt (pitch: 1.75 mm) was provided thereon. As a result, five nuts were obtained from Sheet I.

The so-obtained nuts were subjected to the measurement of the torque strength by the same method as mentioned in Examples 3, 4 and 5. The results obtained are shown in Table 4.

TABLE 4

|  | Sample No. | Found torque strength (kg/cm) | Average torque strength (kg/cm) |
| --- | --- | --- | --- |
| Nuts prepared from | 1 | 900 | 1030 |
| Sheet I | 2 | 1100 |  |
| (thickness: 10 mm) | 3 | 1100 |  |
|  | 4 | 1050 |  |

On the other hand, five square-shaped pieces (22 mm × 22 mm) were cut out of Sheet J, and each of these pieces was subjected to boring by means of a drill. During the course of boring, each piece was broken.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internally threaded fiber-reinforced plastic member comprising a hollow body having a body portion and a central bore constituted by a space formed within and extending longitudinally of the axis of said member and a thread formed integrally with said body on the inner surface of said central bore, said body portion comprising at least one layer selected from:

(I) a layer comprising a plurality of resin-impregnated strands arranged substantially in parallel, (II) a double layer comprising a first unit layer composed of a plurality of resin-impregnated strands arranged substantially in parallel and a second unit layer composed of a plurality of resin-impregnated strands arranged substantially said first unit layer and said bgcond unit layer being piled one upon another such that the resin-impregnated strands of the first unit layer are crossed with those of the second unit layer at an angle (α) defined by the formula $0<\alpha\leqq 90°$, and (III) a herringbone pattern layer comprising a plurality of first strand groups each comprising a plurality of resin-impregnated strands arranged substantially in parallel and a plurality of second strand groups each comprising a plurality of resin-impregnated strands arranged substantially in parallel, said first strand groups cooperating with said second strand groups to form a herringbone pattern structure in which said first strand groups are crossed with said second strand groups at an angle (β) defined by the formula $5\leqq\beta\leqq 90°$;

provided that where said body portion is comprised of the layer (I) alone, said body portion comprises a plurality of the layers (I), and that where said body portion is comprised of a plurality of layers, said layers are laminated and unified such that the resin-impregnated strands of laminate-wise mutually adjacent layers are crossed with respect to each other at an angle (γ) defined by the formula $0\leqq\gamma\leqq 90°$ except for the case in which where the laminate-wise mutually adjacent layers each are layers (I), the resin-impregnated strands of the laminate-wise mutually adjacent layers (I) are crossed with respect to each other at an angle (δ) defined by the formula $0<\delta\leqq 90°$, each layer being arranged substantially in perpendicular relation to the axis of said member, each resin-impregnated strand comprising a plurality of fiber filaments and a thermohardened resin, said thread having therewithin portions of the resin-impregnated strands extending from the body portion.

2. An internally threaded fiber-reinforced plastic member according to claim 1, wherein said angles (α), (β), (γ) and (δ) each are about 90°.

3. An internally threaded fiber-reinforced plastic member according to claim 1, wherein said fiber filaments and said thermohardened resin are present in the internally threaded member at a volume ratio of 30/70 to 70/30.

4. An internally threaded fiber-reinforced plastic member according to claim 1, wherein said resin is selected from the group consisting of epoxy resins, unsaturated polyester resins, epoxy acrylate resins and phenolic resins.

5. An internally threaded fiber-reinforced plastic member according to claim 1, wherein said fiber filaments each have a tensile strength of 100 to 550 Kg/mm$^2$ and a modulus in tension of 6000 to 120,000 Kg/mm$^2$.

6. An internally threaded fiber-reinforced plastic member according to claim 1, wherein said fiber filaments are selected from the group consisting of glass fiber filaments, aramid fiber filaments, carbon fiber filaments, boron fiber filaments and silicon carbide fiber filaments.

* * * * *